(No Model.)
G. PHILIPPART.
ELECTRIC ACCUMULATOR.
No. 292,762. Patented Jan. 29, 1884.
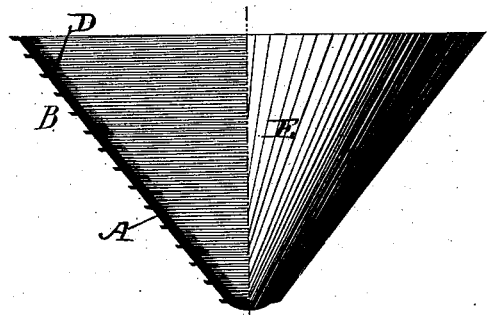
FIG. 1.
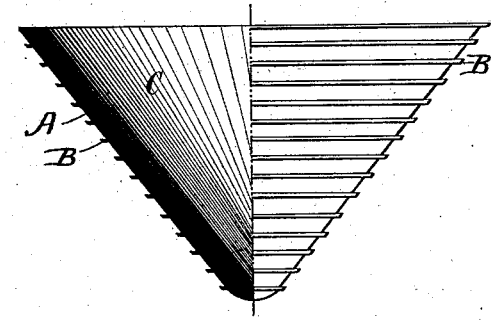
FIG. 2.
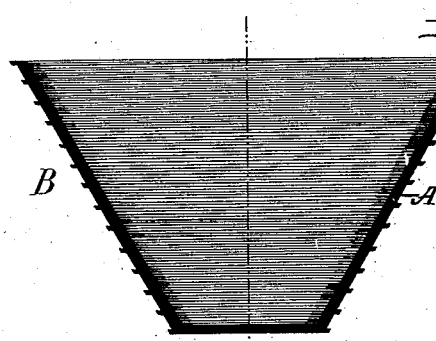
FIG. 3.
FIG. 4.
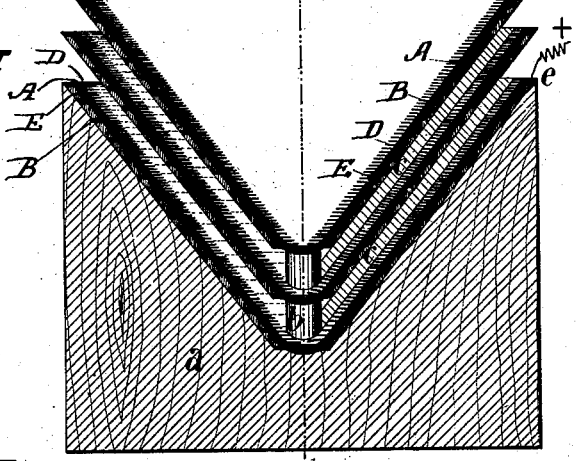
FIG. 5.
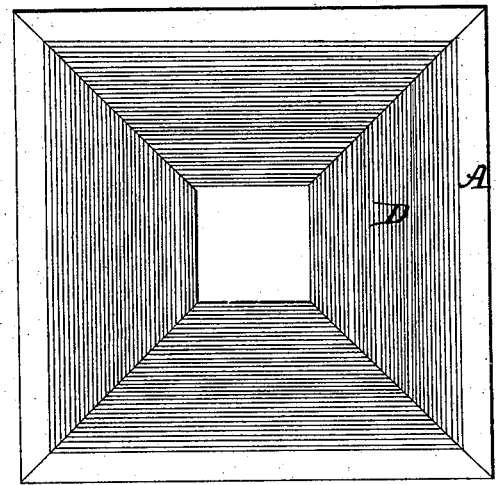
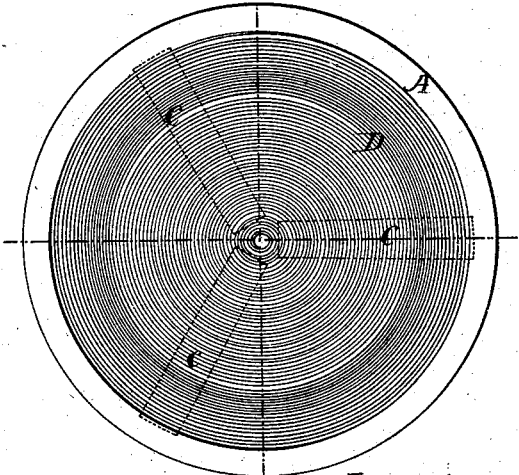
FIG. 6.
Witnesses:
A. Blétry
P. Reuby
Inventor:
G. Philippart
by his attorneys
Briesen & Steele

UNITED STATES PATENT OFFICE.

GUSTAVE PHILIPPART, OF PARIS, FRANCE.

ELECTRIC ACCUMULATOR.

SPECIFICATION forming part of Letters Patent No. 292,762, dated January 29, 1884.

Application filed October 30, 1883. (No model.) Patented in England August 16, 1883, No. 3,970, and in France August 21, 1883.

*To all whom it may concern:*

Be it known that I, GUSTAVE PHILIPPART, civil engineer, a citizen of France, residing at Paris, in the French Republic, have invented certain new and useful Improvements in Electric Accumulators, (for which I have received Letters Patent in England for fourteen years, No. 3,970, dated August 16, 1883, and French patent for fifteen years, August 21, 1883;) and I do hereby declare that the following is a full, clear, and exact description of the invention, which will enable others skilled in the art to which it appertains to make and use the same.

The object of this invention is to so construct batteries and accumulators that they may occupy as small a compass as possible, and at the same time obviate many drawbacks in the present method of constructing such apparatus, especially, first, oxidation and consequent destruction of the parts by which accumulators generally communicate with each other; secondly, the peroxidation of the negative electrode, which after a few weeks of use becomes destroyed, and with it the accumulator; third, the rapid destruction of the case containing the accumulator. Conically-formed secondary batteries have previously been employed by me; but I had abandoned them on account of the rapid destruction of the lead forming the support to the electrodes. I have, however, practically overcome this difficulty, and have also so arranged the negative electrode as to determine the production of peroxide of lead in sufficient quantity and as rapidly as by the Faure system.

The following is the method of constructing the batteries, reference being had to the accompanying drawings, in which—

Figures 1 and 2 are views, partly in vertical section and partly in elevation, of conical vessels which constitute the elements of the cells; Fig. 3, a sectional view, showing a frusto-pyramidal vessel, which may be used instead of that of conical form, Figs. 1 and 2; Fig. 4, a plan of the said frusto-pyramidal vessel; Fig. 5, a sectional view, showing a number of hollow conical vessels assembled to form a battery; and Fig. 6, a plan of the same.

These vessels A, which have solid walls and bottoms, and thus constitute liquid-tight cups or vases, are of lead, and have walls of from five to twenty millimeters in thickness. They are cast with small projections B on the outside and with deep symmetrical projections D, arranged very close together on the inside. The outside is coated with active material—such as a paste made of an oxide or a salt of lead applied thereto in any ordinary or suitable manner—as, for example, with a spatula. This material fills the spaces between the projections B, as shown at E, Figs. 1 and 5. The ribs or projections B serve to hold it in place. The vessels are placed one inside another, as shown in Fig. 5, with strips $c$ and blocks $b$ of insulating material between them. The lower vessel fits in a base, $a$, of wood or other convenient material. The spaces between the vessels are filled with an exciting-liquid, (water acidulated with sulphuric acid, for example.) The vessels at the ends of the series constitute the poles of the battery, and are connected by wires $e$ with the charging-generator, so that the charging-current ascends through the cells. The symmetrical projections D on the inside of the vessels rapidly peroxidize, while the salt or oxide on the outside is reduced. Eventually the projections D may break down and form substantially a smooth internal layer of peroxide, as represented at C, Fig. 2. The inner surface of a vessel forms, therefore, the negative surface or element of a cell of the charged battery, while the outside of the vessel above constitutes the positive of the same cell. Thus the positive element of each cell is connected with the negative element of the cell above through the walls of the vessel A, whose exterior and interior surfaces constitute the said positive and negative elements. There are, therefore, as many cells as there are hollow vessels, less one, and these cells are connected in tension.

It will be readily understood that the batteries, preparatory to regular use, may be charged and discharged a number of times, or, in other words, may have the elements "formed" by any ordinary or suitable "forming" operation, in order to bring it into efficient working order.

In Fig. 1 the active material E is shown applied to the right-hand part of the vessel, (shown in elevation,) while it is omitted from the left-hand part, represented in section. In Fig. 2 it is omitted entirely from the outside, and so also in Fig. 3.

The projections D may be vertical, horizontal, helicoidal, or otherwise formed.

It is evident that modifications may be made in details without departing from the spirit of the invention, and that parts of the invention may be used separately.

The peroxide of lead being on the inside of the vessels, there is not the same liability of its dropping off as if placed on the outside.

I claim—

1. A secondary battery comprising tapering hollow vessels set one within another and held apart, so as to form a series of cells, each vessel having closely-set peroxidized lead projections on the inside and an applied coating of reduced lead on the outside, substantially as described.

2. An element of secondary battery provided with a series of symmetrical projections of cast metal in one piece with their support, and set so close together that they by their juxtaposition constitute, when peroxidized, substantially a layer of active material on said support, substantially as described.

3. The improvement in the manufacture of secondary batteries, consisting in casting the body of an element with a series of symmetrical closely-set projections in one piece with their support, and peroxidizing the same, the said projections forming in virtue of their juxtaposition substantially a layer of active material, as set forth.

4. An element of a secondary-battery cell in the form of a cup or vase, provided with projections and active material applied thereto between said projections, substantially as described.

5. An element of a secondary cell in the form of a cup or vase, provided with a series of symmetrical projections set close together and adapted to form the active material of the element, substantially as described.

6. A cup or vase provided on one surface with projections and active material applied between the same, and on the other with a series of symmetrical projections set close together, substantially as described, whereby it is adapted to form the positive element of one cell and the negative element of an adjacent cell, as set forth.

GUSTAVE PHILIPPART.

Witnesses:
   A. BLÉTUN,
   ROBT. M. HOOPER.